(12) United States Patent
Fischer

(10) Patent No.: US 8,412,956 B2
(45) Date of Patent: Apr. 2, 2013

(54) ELECTRONIC UNIT PROVIDED IN A MICROCIRCUIT CARD AND INCLUDING CRYPTOGRAPHIC MEANS FOR HIGH-SPEED DATA PROCESSING

(75) Inventor: Jean-Bernard Fischer, Le Kremlin-Bicetre (FR)

(73) Assignee: Oberthur Technologies, Levallois-Perret (FR)

( * ) Notice: Subject to any disclaimer, the term of this patent is extended or adjusted under 35 U.S.C. 154(b) by 1404 days.

(21) Appl. No.: 10/499,449

(22) PCT Filed: Dec. 20, 2002

(86) PCT No.: PCT/FR02/04508
§ 371 (c)(1),
(2), (4) Date: Jun. 21, 2004

(87) PCT Pub. No.: WO03/054670
PCT Pub. Date: Jul. 3, 2003

(65) Prior Publication Data
US 2005/0055549 A1 Mar. 10, 2005

(30) Foreign Application Priority Data
Dec. 21, 2001 (FR) ...................................... 01 16733

(51) Int. Cl.
*G06F 12/14* (2006.01)
(52) U.S. Cl. ........................................................ 713/193
(58) Field of Classification Search .................. 726/9
See application file for complete search history.

(56) References Cited

U.S. PATENT DOCUMENTS

| 5,923,759 | A  | * | 7/1999 | Lee ............................... 713/159 |
| 6,341,274 | B1 | * | 1/2002 | Leon .............................. 705/410 |
| 6,557,754 | B2 | * | 5/2003 | Gray et al. ..................... 235/375 |
| 7,380,131 | B1 | * | 5/2008 | Trimberger .................... 713/193 |
| 2001/0011353 | A1 | * | 8/2001 | Little et al. ..................... 713/200 |
| 2003/0173400 | A1 | * | 9/2003 | Morita et al. .................. 235/380 |
| 2004/0221156 | A1 | * | 11/2004 | Genevois et al. ............. 713/154 |

FOREIGN PATENT DOCUMENTS

| WO | 98/07255  | 2/1998  |
| WO | 00/76119  | 12/2000 |

* cited by examiner

*Primary Examiner* — Michael S McNally
*Assistant Examiner* — Daniel Hoang
(74) *Attorney, Agent, or Firm* — Young & Thompson

(57) ABSTRACT

An electronic unit includes a processor (P), an input-output device (18) and a cryptographic device (14). The unit is directly connected by two-way data transmission (20) set up between the input-output device and the cryptographic device, the electronic unit being integrated in a microcircuit card.

20 Claims, 2 Drawing Sheets

ELECTRONIC UNIT PROVIDED IN A MICROCIRCUIT CARD AND INCLUDING CRYPTOGRAPHIC MEANS FOR HIGH-SPEED DATA PROCESSING

BACKGROUND OF THE INVENTION

1. Field of the Invention

The invention relates to an electronic unit comprising a processor, data input-output means, and cryptographic means; it relates more particularly to a new arrangement of these subsystems that speeds up the cryptographic processing of certain data.

2. Description of the Related Art

One prior art electronic unit incorporating cryptographic means is based on a processor associated with different memories (RAM, ROM and EEPROM, for example) and connected to input-output means. The processor is connected to the cryptographic means via a memory register. The cryptographic means generally comprise electronic circuits dedicated to cryptographic calculations and specifically designed to carry out those calculations very quickly. The operations carried out are, for example, encryption and decryption operations using a DES protocol. In the field of microcircuit cards, there exist very light cryptographic units containing of the order of 5 000 logic gates capable of carrying out DES calculations in just 16 clock pulses. By comparison, copying 8 bytes into a register necessitates 48 clock pulses (8 bytes is the length of a word in DES encryption). The input-output means comprise a UART interface, for example, exchanging information with devices external to said electronic unit in accordance with the ISO7816 or Universal Serial Bus (USB) protocol. The UART interface comprises a register. Prior art cryptographic means (usually referred to as a cryptographic calculation unit) are connected directly to the processor, which manages all aspects of the transfer of the data to be encrypted or decrypted to the cryptographic means, the execution of the encrypting/decrypting operations, and the sending of the results back to the input-output means. Clearly this mode of operation, which monopolizes the processor in each step, is relatively slow and involves a relatively high consumption of energy. The invention overcomes these drawbacks.

BRIEF SUMMARY OF THE INVENTION

The invention relates more particularly to an electronic unit comprising a processor, data input-output means and cryptographic means, characterized by a direct bidirectional data transmission connection set up between said input-output means and said cryptographic means, said electronic unit being provided in a microcircuit card.

It also relates to a microcircuit card including this kind of electronic unit.

To provide the direct connection, the input-output means and the cryptographic means may share a common memory space. This may be the memory register conventionally associated with the cryptographic means.

The input-output means advantageously comprise a send-receive unit, for example a UART, and a direct connection is set up between said send-receive unit and the memory register of the cryptographic means.

In one embodiment, the send-receive unit includes means for routing data to said cryptographic means. In other words, in a simple manner that will be evident to the person skilled in the art the UART may be complemented by "routing means" for sending the data to the memory register and then to the cryptographic calculation unit, once the information has been identified as relating to cryptographic processing, the input-output means also including means for identifying such information.

On the other hand, if the UART send-receive unit is not designed to drive the cryptographic means directly, the processor, which is connected to the cryptographic means, may be programmed to set up said direct connection in response to a message sent by said input-output means. In this case, the role of the processor is limited to identifying the appearance of a series of data to which cryptographic processing relates and setting up said direct connection so that the information is routed directly to the cryptographic means and sent back to the input-output means after processing.

According to other preferred features of the invention, which may where applicable be combined:
 the processor comprises means for sending keys to the cryptographic means, selecting an encryption or decryption mode of operation, and sending an instruction for initiating cryptographic processing;
 it comprises two input-output means;
 it includes means for processing a digital data stream;
 the processing means are adapted to effect encryption or decryption processing.

BRIEF DESCRIPTION OF THE DRAWING FIGURES

The invention will be better understood and other advantages will become more clearly apparent in the light of the following description of a plurality of embodiments of an electronic unit conforming to the principle of the invention, provided by way of example only and given with reference to the appended drawings, in which.

DETAILED DESCRIPTION OF THE PREFERRED EMBODIMENTS

Figure 1:
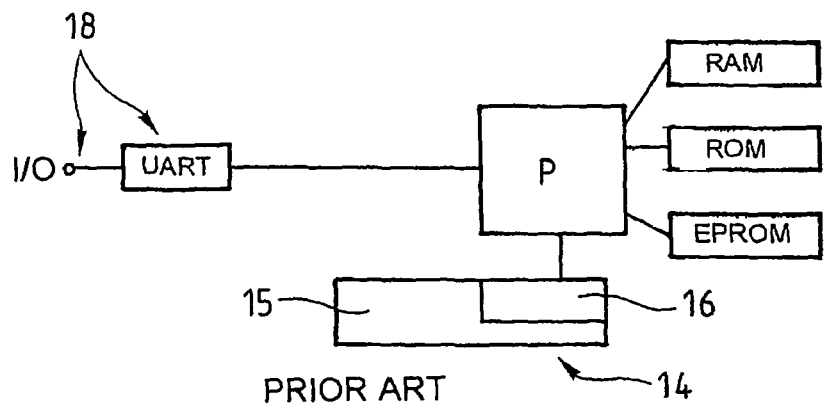
FIG. 1 is a block diagram of a prior art electronic unit.

The prior art electronic unit 11 shown in FIG. 1 consists mainly of a processor P that is associated in the conventional way with a certain number o-f memories (RAM, ROM, EEPROM), cryptographic means 14 comprising a cryptographic calculation unit 15 and a memory register 16, and input-output means 18 connected to a network, for example. The input-output means 18, enabling the electronic unit to communicate with a network or an external electronic entity, essentially comprise an asynchronous send-receive unit known as a UART. The cryptographic means 14 are also connected to the processor via the memory register 16. The other memories connected to the processor are conventional. There are, for example, a random access memory RAM, a read only memory ROM, and a non-volatile memory EEPROM.

When the electronic unit receives via the UART data that must be subjected to cryptographic processing (encryption, decryption, etc.), the UART sends an interrupt message to the processor P which then reads the register of the UART and copies the data into RAM. The processor then initializes the cryptographic means, in particular supplying the necessary keys to the cryptographic unit 15. The processor P then reads the data to be processed in the RAM and copies it into the register 16, after which it initiates the calculation by the cryptographic unit. In order to be communicated to the external network, the result calculated by the cryptographic unit is then read in the register 16 and copied into the UART register by the processor P. The results are rewritten into the register 16, read by the processor, and sent to the network via the UART.

This mode of operation is not suitable for cryptographic processing by the electronic unit at high data bit rates. The operation carried out by the processor P of copying the data into an intermediate RAM area before processing by the cryptographic unit represents a particular burden. Now, the requirement is to increase the cryptographic calculation capability of an electronic unit of this kind in order to be able to process large and continuous data streams in real time.

For example, it is now required to decrypt in real time digital data representative of sound. Such data is compressed according to the MP3 standard and transmitted at a bit rate of 128 kbit/s. The electronic unit for decrypting the data in real time must therefore be able to absorb and process information at a high bit rate. Furthermore, because the electronic unit described hereinafter may advantageously be accommodated inside a microcircuit card, this kind of cryptographic processing is made more secure by virtue of the simple fact that the decryption key(s) never leave the card.

Figure 2:
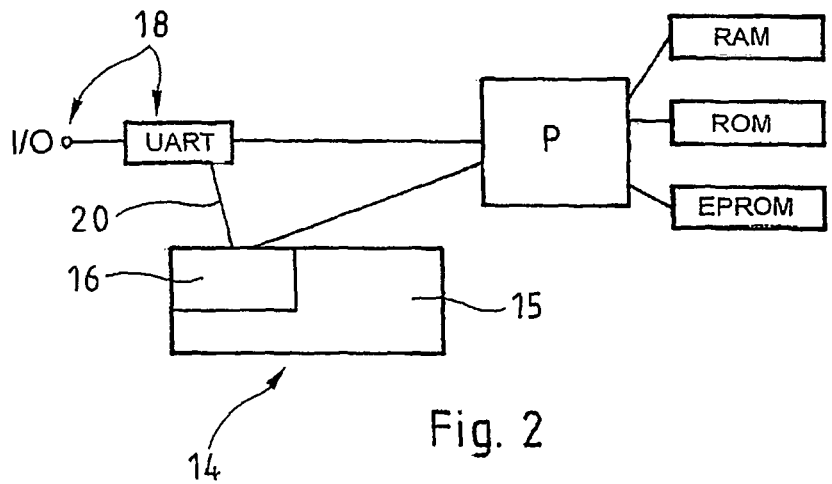
FIG. 2 is a block diagram analogous to FIG. 1 showing one embodiment of an electronic unit according to the invention.

To this end, a direct bidirectional data transmission connection is set up between the input-output means (i.e. typically the UART send-receive unit) and the cryptographic means. The arrangement depicted in FIG. 2 may be used, for example.

The UART send-receive unit is connected to the processor which is conventionally associated with various memories (RAM, ROM, EEPROM), as in FIG. 1. Moreover, and as previously, the electronic unit comprises cryptographic means 14 including a cryptographic calculation unit 15 associated with a memory register 16. The processor is connected to the cryptographic means via the memory register. However, a direct bidirectional data transmission connection 20 is also set up between the UART input-output means and the cryptographic means, in this example the same memory register 16.

The send-receive unit ideally comprises means for routing data to the cryptographic means. In other words, this unit is adapted to analyze information sent by the external network and recognize information to be subjected to cryptographic processing. Once this recognition has been effected, the input-output means route the information directly to the memory register 16 of the cryptographic means. The processor sends the keys to the cryptographic means, defines the mode of operation (for example encryption or decryption, with or without chaining) and sends an instruction for initiating the cryptographic processing. During this time, i.e. after launching the cryptographic processing, the processor is no longer operative in the cryptographic process or even in the transfer of the results to the exterior; this reduces power consumption. Security is also enhanced since the information is no longer stored in the memory connected to the processor.

In other words, this send-receive unit comprises means for setting up a direct connection with the cryptographic means.

Those means are rudimentary, with little intelligence, since a smart card is used and the components must therefore be relatively simple and of moderate cost. Thus above all there is no question of using a command interpreter. The UART is not capable of interpreting commands received via the I/O port.

If the UART send-receive unit is not designed to detect for itself a sequence to which the cryptographic processing applies, that function may be handled by the processor P without excessive loss of time. For example, the first packet of a message intended to undergo cryptographic processing could describe the content of subsequent packets. In this case, on receiving this first packet, the processor is able to command "routing", i.e. setting up the direct bidirectional data transmission connection 20 between the input-output means and the cryptographic means for the time necessary to receive and/or send back the information processed by the cryptographic means. The microprocessor P decides to set up this direct connection in order to optimize the processing speed for processing a large data stream.

Figure 3:
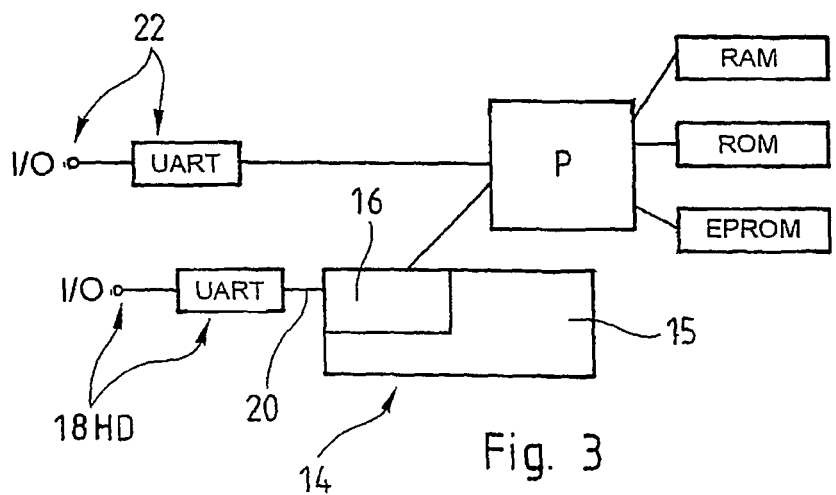
FIG. 3 shows a variant of the electronic unit conforming to the invention.

In the FIG. 3 device, in which subsystems analogous to those of FIG. 1 carry the same reference numbers, information concerning cryptography is separated from other data. The input-output means 18HD connected to a high bit rate port are this time exclusively and directly connected to the cryptographic means (by the direct connection 20); the other information is sent to other input-output means 22 and reaches the processor via another send-receive unit, for example a UART. Thus the processor is able to communicate with a server in parallel via a "standard" port, the cryptographic data being sent via a high bit rate port, for example a USB port. Thus no routing is necessary.

Figure 4:
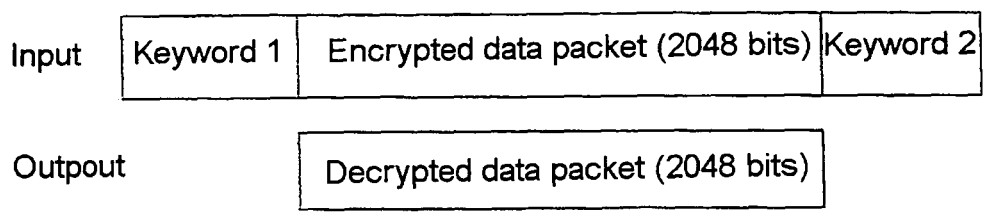
FIG. 4 is diagram showing input data and output data for one embodiment of the invention.
Figure 5:
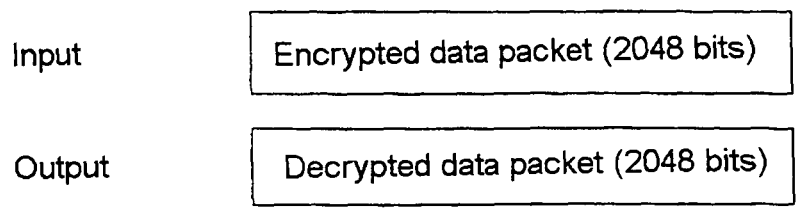
FIG. 5 is a diagram showing input data and output data for another embodiment of the invention.

FIGS. 4 and 5 are diagrams depicting data formats that may be processed in accordance with the invention.

Thus in FIG. 4 the input receives an encrypted data packet (2048 bits) preceded by a keyword 1 and followed by a keyword 2 and a decrypted data packet (2048 bits) is obtained at the output.

By means of security mechanisms (for example authentication of the sender and where applicable exchange of keys), the processor authorizes decryption of the next data packet received. The processor sends the decryption key to the cryptographic calculation unit 15 and sends the instruction for initiating the processing. The processor also sends a message directly to the UART in order for the latter to route the data packets directly to the cryptographic calculation unit 15 when it recognizes the keyword 1 and to stop sending data to the cryptographic calculation unit 15 when it recognizes the keyword 2. The cryptographic calculation unit 15 then decrypts the data packet. The result of the calculation is then communicated directly to the exterior of the card by the UART.

In FIG. 5, encrypted and decrypted data packets are present at the input and the output, respectively.

By means of security mechanisms (for example authentication of the sender and where applicable exchange of keys), the processor authorizes decrypting of the next data packet received, and knows in advance that this will occupy 2048 bits. The processor sends the decryption key to the cryptographic calculation unit 15 and sends the instruction for initiating the processing. The processor also sends a message to the UART so that the latter routes the next 2048 data bits received directly to the cryptographic calculation unit 15 and sends the 2048 bits of the result of the cryptographic processing from the output of the cryptographic calculation unit 15 to the exterior of the card and then routes the data at the input of the UART directly to the processor again.

The invention claimed is:

1. A cryptographic processing method within an electronic entity comprising a processor, a data input-output element and a cryptographic element, said method comprising the steps of identifying within said electronic unit a sequence to be subjected to cryptographic processing in incoming data received by said input-output element;

setting up a direct bidirectional data transmission connection between said input-output element and said cryptographic element so as to route said sequence directly from said input-output element to the cryptographic element;

sending from the processor to the cryptographic element an instruction for initiating cryptographic processing on said routed sequence with keys sent by the processor according to an encryption or decryption mode of operation selected by the processor; and applying said cryptographic processing to said sequence according to said information received from said processor, wherein decryption key(s) never leave the card.

2. The method of claim 1, wherein said identifying step is applied by said input-output element.

3. The method of claim 1, wherein said identifying step is applied by said processor on a message transmitted by the data input-output element.

4. The method of claim 1, wherein the sequence to be subjected to cryptographic processing comprise encrypted data to be encrypted/decrypted in real time, such encrypted data being representative of sound.

5. A microcircuit card, comprising an electronic unit comprising:
a data input-output element comprising a UART send-receive unit,
a cryptographic element comprising a memory register,
a processor connected to the data input-output element and to the cryptographic element, and configured, when detecting information to be subjected to a cryptographic processing in a message sent by said input-output element, to set up a direct connection bidirectional data transmission connection between the data input-output element and the memory register of the cryptographic element for routing such information directly from the UART to the cryptographic element, and to send to this cryptographic element an instruction and a key for initiating cryptographic processing of this information according to an encryption or decryption mode selected by the processor, the key(s) never leaving the card, whereby information received by the data input-output element is enabled by the processor to be routed by the UART send-receive unit directly to the cryptographic element where it is subjected to a cryptographic processing defined by the processor.

6. The microcircuit card of claim 5, wherein the microcircuit card constitutes a device for decrypting encrypted data in real time, such encrypted data being representative of sound.

7. The microcircuit card of claim 5, including a processing element adapted to effect encryption or decryption processing on a digital data stream.

8. The microcircuit card of claim 5, wherein the processor is configured to send, in response to said message, the decryption key(s) to the cryptographic element and a message to the input/output element in order to route to the cryptographic element data packets recognized between successive keywords, and the decryption key(s) are provided independent of the data.

9. A microcircuit card, comprising an electronic unit comprising:
a cryptographic element comprising a memory register,
a data input-output element comprising a UART send-receive unit, configured to analyze information received from the exterior and recognize information to be subjected to a cryptographic processing, and to set up a direct bidirectional data transmission connection with the memory register whereby said information to be subjected to a cryptographic processing is routed to the memory register,
a processor connected to the data input-output element and to the cryptographic element, and configured to send to the cryptographic element a key, to select an encryption or decryption mode of operation and to send to this cryptographic element an instruction for initiating cryptographic processing according to a selected encryption or decryption mode, after the date input-output element has recognized the information to be subjected to the cryptographic processing, the key never leaving the card, whereby information recognized to be subjected to a cryptographic processing is routed directly to the cryptographic element where it is subjected to a cryptographic processing defined by the processor.

10. The microcircuit card of claim 9, wherein said send-receive unit comprises a device for routing data to said cryptographic element.

11. The microcircuit card of claim 9, wherein said input-output element is dedicated to certain information intended to be processed by said cryptographic element, other input-output elements being connected to said processor for processing other information.

12. The microcircuit card of claim 9, wherein the microcircuit card constitutes a device for decrypting encrypted data in real time, such encrypted data being representative of sound.

13. A microcircuit card, comprising:
a processor,
a data input-output element comprising a UART send-receive unit and connected to the processor, and
a cryptographic element comprising a memory register connected to said processor connected to the processor, said cryptographic element being further connected to said data input-output element by a direct bidirectional data transmission connection between said UART send-receive unit of the input-output element and said memory register of the cryptographic element,
the processor and the data input-output being configured so that, when information on data to be subjected to a cryptographic processing is recognized in the card, a direct transmission of said data is then set up through said direct connection for transmitting said data directly to said cryptographic element, and at least a key and an instruction are sent by the processor to the co-processor for initiating cryptographic processing of said data according to a selection mode of encryption or decryption, key(s) never leaving the card,
whereby said data directly transmitted to said cryptographic element is subjected in said cryptographic element to a cryptographic processing defined by said processor.

14. The microcircuit card of claim 13, wherein said UART send-receive unit comprises an element configured for recognizing said data to be subjected to a cryptographic processing and for routing this data directly to said cryptographic element.

15. The microcircuit card of claim 13, wherein said processor is adapted to detect a message intended to undergo cryptographic processing and, as a consequence, to set up said direct connection for the time necessary to receive and/or send back the data processed by the cryptographic element.

16. The microcircuit of claim 13, wherein said cryptographic element is adapted to decrypting encrypted data in real time.

17. The microcircuit card of claim 13, including a processing element configured for processing a digital data stream.

18. The microcircuit card of claim 17, wherein said processing element is adapted to process in real time digital data representative of sound.

19. The microcircuit card of claim 13, wherein said UART send-receive unit is adapted to exchange with external devices in accordance with either an ISO7816 or USB protocol.

20. The microcircuit card of claim 13, wherein the microcircuit card constitutes a device for decrypting encrypted data in real time, such encrypted data being representative of sound.

* * * * *

UNITED STATES PATENT AND TRADEMARK OFFICE
CERTIFICATE OF CORRECTION

PATENT NO.        : 8,412,956 B2                                                  Page 1 of 1
APPLICATION NO.   : 10/499449
DATED             : April 2, 2013
INVENTOR(S)       : Jean-Bernard Fischer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1516 days.

Signed and Sealed this
First Day of September, 2015

Michelle K. Lee
*Director of the United States Patent and Trademark Office*